2,845,456
PREPARATION OF PANTOTHENIC ACID SALTS

Fred Kagan, Kalamazoo Township, Kalamazoo County, Mich., assignor to The Upjohn Company, Kalamazoo, Mich., a corporation of Michigan No Drawing. Application December 17, 1954
Serial No. 476,079

10 Claims. (Cl. 260—534)

The present invention relates to a novel process for the preparation of salts of pantothenic acid, and is more particularly concerned with the preparation of salts of β-alanine followed by coupling of said salts with α-hydroxy-β,β-dimethyl-γ-butyrolactone to produce the desired salts of pantothenic acid.

Physiologically active salts of D(+)pantothenic acid, e. g., the calcium or sodium salt, have been produced in the prior art by coupling the respective salt of β-alanine in an alcoholic medium with D(−)α-hydroxy-β,β-dimethyl-γ-butyrolactone or with racemic α-hydroxy-β,β-dimethyl-γ-butyrolactone. The prior art processes, however, ordinarily require between one day and several weeks to complete because the salts of pantothenic acid as initially obtained therefrom are quite impure and often amorphous, and must be upgraded by slow and tedious purification procedures, e. g., recrystallization, in order to meet specification standards, such as U. S. P. standards. Furthermore, the yields are only mediocre and leave a great deal to be desired. Moreover, in the prior art processes removal of the solvent employed in the reaction is usually necessary before crystallization will actually begin.

According to the process of the present invention a salt of pantothenic acid is prepared by reacting an alkali-metal or alkaline-earth metal salt of β-alanine with α-hydroxy-β,β-dimethyl-γ-butyrolactone in the presence of a liquid aliphatic hydroxy compound, more specifically a liquid aliphatic straight or branched-chain polyhydroxy compound containing less than seven carbon atoms and from two to three hydroxy radicals, or a monoether thereof containing less than twelve carbon atoms and from one to two hydroxy radicals.

The process of the present invention in contrast to the prior art, produces crystalline salts of pantothenic acid in much shorter time, in excellent yields, and of improved quality. Moreover, the salts of pantothenic acid produced by the present process crystallize in a pure condition directly from the reaction mixture as they are formed, thus obviating the need for further purification, other than mere removal of residual solvent from the separated crystals.

The process of the present invention, more specifically, involves reacting an alkali-metal, an alkaline-earth metal, or an alkali-metal, or an alkali-metal or alkaline-earth alkoxide, with an excess quantity of the aforementioned aliphatic hydroxy compound, reacting the resulting alkali-metal or alkaline-earth metal salt of the aliphatic hydroxy compound with β-alanine to form a salt of β-alanine, and reacting the salt of β-alanine with α-hydroxy-β,β-dimethyl-γ-butyrolactone in the presence of the remaining unreacted aliphatic hydroxy compound to produce the corresponding salt of pantothenic acid. When an alkali metal, alkaline-earth metal, an alkali-metal hydride, is employed as the starting reactant, the starting aliphatic hydroxy compound, with which the metal or metal hydride is reacted, must contain at least one hydroxy radical which is part of a primary alcohol group.

In addition to the advantages already set forth there are obtained still further advantages, for example, the salt of β-alanine can be prepared in situ, isolation of this key intermediate is unnecessary, no additional coupling solvent is necessary, and the overall yield is remarkably good.

Aliphatic hydroxy compounds which can be employed in the process of the present invention include the normally liquid polyhydroxy compounds containing less than seven carbon atoms such as ethylene glycol, diethylene glycol, triethylene glycol, propylene glycol, trimethylene glycol, tetramethylene glycol, glycerine, isobutylene glycol (2-methyl-1,2-propanediol), beta butylene glycol (2,3-butanediol), and the like, and monoethers thereof, for example, ethers of diethylene glycol sold under the trademark Carbitol and containing up to and including eleven carbon atoms such as Carbitol (diethylene glycol monoethyl ether), methyl Carbitol (diethylene glycol monomethyl ether), butyl Carbitol (diethylene glycol monobutyl ether), hexyl Carbitol (diethylene glycol monohexyl ether), benzyl Carbitol (diethylene glycol monobenzyl ether), phenyl Carbitol (diethylene glycol monophenyl ether), and ethers of ethylene glycol sold under the trademark Cellosolve and containing less than ten carbon atoms such as Cellosolve (ethylene glycol monoethyl ether), methyl Cellosolve (ethylene glycol monomethyl ether), butyl Cellosolve (ethylene glycol monobutyl ether), hexyl Cellosolve (ethylene glycol monohexyl ether), benzyl Cellosolve (ethylene glycol monobenzyl ether), phenyl Cellosolve (ethylene glycol monophenyl ether), 3-methoxy-2-butanol, 1-ethyl-4-ethoxy-1-butanol, and the like.

Representaive alkali metals, alkaline-earth metals, alkali-metal hydrides, alkaline-earth alkoxides, and alkali-metal alkoxides, which can be employed in the present process, include sodium, potassium, calcium, barium, sodium hydride, sodium ethoxide, potassium methoxide, calcium ethoxide, calcium methoxide, calcium isopropoxide, potassium t-butoxide, and the like.

D(−)α-hydroxy-β,β-dimethyl-γ-butyrolactone [Stiller et al., J. Am. Chem. Soc. 62, 1789 (1940)] is ordinarily employed as the starting compound in the preparation of physiologically active salts of D(+)pantothenic acid. However, racemic α-hydroxy-β,β-dimethyl-γ-butyrolactone can also be employed as the starting compound and, if desired, the resulting salt of racemic pantothenic acid can be resolved, e. g., according to the process outlined in U. S. Patent 2,341,610, to separate the physiologically active (+) salt from the physiologically inactive (−) salt. In fact, the novel process is applicable to any α-hydroxy-β,β-dimethyl-γ-butyrolactone, including the L(+) isomer and mixtures of the D(−) and L(+) isomers in any proportions.

In carrying out the process of this invention an alkali-metal, alkaline-earth metal, alkali-metal hydride, alkali-metal alkoxide, or an alkaline-earth alkoxide, is reacted with an excess quantity of an aliphatic hydroxy compound of the group described above to produce an alkali-metal or alkaline-earth metal salt of the aliphatic hydroxy compound. The reaction is advantageously conducted at a temperature between about 75 and about 250 degrees centigrade. In many instances the boiling point of the solvent at atmospheric pressure is a satisfactory and convenient reaction temperature. The reaction can be conducted in the presence of a small amount of water, such as up to about five percent of water based on the weight of the reaction mixture, although for best results substantially anhydrous conditions are preferred.

In those instances wherein an alkali-metal alkoxide or an alkaline-earth metal alkoxide is reacted with the aliphatic hydroxy compound, the resulting alkanol can be removed from the reaction mixture, e. g., by distillation, to avoid an undesirable state of equilibrium.

The resulting reaction mixture, containing the alkali-metal or alkaline-earth metal salt of the aliphatic hydroxy compound dissolved in the excess aliphatic hydroxy compound, is cooled and β-alanine is added thereto to convert the β-alanine to an alkali-metal or alkaline-earth metal salt. This reaction is conducted between about twenty and about 100 degrees centigrade, and more particularly between about thirty and about forty degrees centigrade. The conversion is generally completed in a period between about thirty minutes and about three hours and is ordinarily completed in about one hour at 35 degrees centigrade.

To the thus-produced reaction solution of alkali-metal or alkaline-earth salt of β-alanine and unreacted aliphatic hydroxy compound is added α-hydroxy-β,β-dimethyl-γ-butyrolactone. The reaction is advantageously carried out between about twenty and about eighty degrees centigrade, preferably between about thirty and about forty degrees centigrade. The reaction is generally completed in a period between about thirty minutes and about four hours, suitably in about two hours at 35 degrees centigrade. The solution is preferably filtered to remove extraneous materials and the filtrate is seeded, while stirring, with the desired salt of panthothenic acid, and stirring is continued for a period of between about three and about ten hours. The resulting crystalline precipitate, i. e., salt of pantothenic acid, is removed by filtration, washed, and dried.

The following examples are illustrative of the process and products of the present invention, but are not to be construed as limiting.

EXAMPLE 1

*Preparation of D(+)calcium pantothenate*

In a three-neck, round-bottomed flask equipped with a stirrer and a condenser fitted with a drying tube was placed 3.5 grams (0.0875 mole) of calcium turnings and 200 milliliters of methyl Cellosolve. The reaction mixture was heated at reflux under nitrogen with stirring for one hour. The heating mantle was removed and stirring was continued while the reaction mixture cooled. The flask was then immersed in a constant-temperature bath at 35 degrees centigrade and 15.6 grams (0.175 mole) of β-alanine was added and stirring was continued for one hour.

D(−)α-hydroxy-β,β - dimethyl - γ - butyrolactone (25.2 grams; 0.193 mole; ten percent excess) was added to the reaction mixture and stirring was continued for about two hours at 35 degrees centigrade. Celite (1.0 gram) was added to the black solution, which was then filtered through a pressure filter in a nitrogen atmosphere to remove the black coloration. The filtrate was transferred to a three-neck flask equipped with a mechanical stirrer and a nitrogen inlet, and the flask was placed in the 35-degree centigrade, constant-temperature bath. The clear solution was seeded with calcium pantothenate and stirred in a nitrogen atmosphere for seven hours. The white solid which separated was removed by filtration and was washed on the filter with 300 milliliters of methyl Cellosolve. The product D(+)calcium pantothenate, was dried in a vacuum desiccator over concentrated sulfuric acid for two days, and residual solvent was removed in a vacuum oven at fifty degrees centigrade (24 hours). The yield of D(+)calcium pantothenate was 36.0 grams (86.3 percent yield based on β-alanine) and the product melted at 193.5–195 degrees centigrade. A second crop, obtained by further stirring of the mother liquor, weighted 0.38 gram (0.9 percent yield based on β-alanine) and melted at 193.5–195 degrees centigrade.

The remaining mother liquor was concentrated under reduced pressure to remove methyl Cellosolve. The residue was taken up in sixty milliliters of ten percent hydrochloric acid, and the solution was heated on a steam bath for four hours. After cooling, the aqueous solution was extracted with chloroform (150 milliliters), and the chloroform solution was dried over anhydrous sodium sulfate. The chloroform was removed under reduced pressure, leaving 4.0 grams of recovered D(−)pantolactone. An aliquot of the recovered lactone was sublimed, and had a specific rotation in water of −48 degrees. The yield of D(+)calcium pantothenate based on D(−)pantolactone was 93.5 percent.

The specific rotation of the calcium pantothenate in water was +26 degrees. The calcium content was 8.23 percent (calculated 8.41 percent); the accepted U. S. P. standard is 8.2–8.5 percent calcium. The loss on drying was 0.24 percent in comparison to the accepted U. S. P. standard of five percent.

The compound was completely active in a bioassay with *Lactobacillus arabinosus.*

EXAMPLE 2

*Preparation of D(+)sodium pantothenate*

In essentially the same manner as disclosed in Example 1, D(+)sodium pantothenate is prepared by using sodium and an excess quantity of methyl Carbitol as the initial reactants.

EXAMPLE 3

*Preparation of D(+)sodium pantothenate*

In essentially the same manner as disclosed in Example 1, D(+)sodium pantothenate is prepared by using sodium hydride and an excess quantity of methyl Cellosolve as the initial reactants.

EXAMPLE 4

*Preparation of D(+)sodium pantothenate*

In essentially the same manner as disclosed in Example 1, D(+)calcium pantothenate is prepared by using calcium ethoxide and an excess quantity of ethylene glycol as the initial reactants with continuous removal of ethanol by distillation as the calcium salt of ethylene glycol is formed.

EXAMPLE 5

*Preparation of D(+)sodium pantothenate*

In essentially the same manner as disclosed in Example 1, D(+)sodium pantothenate is prepared by using sodium methoxide and an excess quantity of beta-butylene glycol (2,3-butanediol) as the initial reactants with continuous removal of methanol by distillation as the sodium salt of beta-butylene glycol is formed.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A process which comprises the steps of reacting a reagent selected from the group consisting of alkali metals, alkaline earth metals, alkali-metal hydrides, alkali-metal alkoxides, and alkaline-earth alkoxides with an excess of a liquid aliphatic hydroxy compound selected from the group consisting of aliphatic polyhydroxy compounds containing less than seven carbon atoms and from two to three hydroxy radicals, and monoethers thereof containing less than twelve carbon atoms and from one to two hydroxy radicals, characterized in that when an alkali metal, alkaline earth metal, and alkali-metal hydride is utilized that at least one of the hydroxy radicals of the aliphatic polyhydroxy compound and monoethers thereof is part of a primary alcohol group, and is further characterized in that when an alkoxide is utilized that the alkanol produced by the reaction is concomitantly removed by distillation, reacting the thus-produced compound in the presence of the remaining unreacted aliphatic hydroxy compound with β-alanine at a temperature between about 20 and about 100 degrees centigrade to produce a salt of β-alanine, and reacting thereafter the resulting salt of β-alanine with α-hydroxy-β,β-dimethyl-γ-butyrolactone in the presence of the remaining unreacted aliphatic hydroxy compound at a temperature between about 20 and about 80 degrees centigrade to produce a salt of pantothenic acid.

2. A process which comprises the steps of reacting a reagent selected from the group consisting of alkali metals, alkaline-earth metals, and alkali-metal hydrides, with an excess of a liquid aliphatic hydroxy compound selected from the group consisting of aliphatic polyhydroxy compounds containing less than seven carbon atoms and from two to three hydroxy radicals of which at least one is part of a primary alcohol group, and monoethers thereof containing less than twelve carbon atoms and from one to two hydroxy radicals of which at least one is part of a primary alcohol group, reacting the thus-produced compound in the presence of the remaining unreacted aliphatic hydroxy compound with β-alanine at a temperature between about 20 and about 100 degrees centigrade to produce a salt of β-alanine, and reacting thereafter the resulting salt of β-alanine with α-hydroxy-β,β-dimethyl-γ-butyrolactone in the presence of the remaining unreacted aliphatic hydroxy compound at a temperature between about 20 and about 80 degrees centigrade to produce a salt of pantothenic acid.

3. A process which comprises the steps of reacting a compound selected from the group consisting of alkali-metal alkoxides and alkaline-earth alkoxides with an excess of a liquid aliphatic hydroxy compound selected from the group consisting of aliphatic polyhydroxy compounds containing less than seven carbon atoms and from two to three hydroxy radicals, and monoethers thereof containing less than twelve carbon atoms and from one to two hydroxy radicals, and concomitantly removing by distillation the alkanol produced by the reaction, reacting the resulting alkanol-free compound in the presence of the remaining unreacted aliphatic hydroxy compound with β-alanine at a temperature between about 20 and about 100 degrees centigrade to produce a salt of β-alanine, and reacting thereafter the resulting salt of β-alanine with α-hydroxy-β,β-dimethyl-γ-butyrolactone in the presence of the remaining unreacted aliphatic hydroxy compound at a temperature between about 20 and about 80 degrees centigrade to produce a salt of pantothenic acid.

4. A process which comprises the steps of reacting a reagent selected from the group consisting of alkali metals, alkaline-earth metals, and alkali-metal hydrides, with an excess of a liquid aliphatic hydroxy compound selected from the group consisting of aliphatic polyhydroxy compounds containing less than seven carbon atoms and from two to three hydroxy radicals of which at least one is part of a primary alcohol group, and monoethers thereof containing less than twelve carbon atoms and from one to two hydroxy radicals of which at least one is part of a primary alcohol group, reacting the thus-produced compound in the presence of the remaining unreacted aliphatic hydroxy compound with β-alanine at a temperature between about thirty and about forty degrees centigrade to produce a salt of β-alanine, and reacting thereafter the resulting salt of β-alanine with α-hydroxy-β,β-dimethyl-γ-butyrolactone in the presence of the remaining unreacted aliphatic hydroxy compound at a temperature between about thirty and about forty degrees centigrade to produce a salt of pantothenic acid.

5. A process which comprises the steps of reacting a compound selected from the group consisting of alkali-metal alkoxides and alkaline-earth alkoxides with an excess of a liquid aliphatic hydroxy compound selected from the group consisting of aliphatic polyhydroxy compounds containing less than seven carbon atoms and from two to three hydroxy radicals, and monoethers thereof containing less than twelve carbon atoms and from one to two hydroxy radicals, and concomitantly removing by distillation the alkanol produced by the reaction, reacting the resulting alkanol-free compound in the presence of the remaining unreacted aliphatic hydroxy compound with β-alanine at a temperature between about thirty and about forty degrees centigrade to produce a salt of β-alanine, and reacting thereafter the resulting salt of β-alanine with α-hydroxy-β,β-dimethyl-γ-butyrolactone in the presence of the remaining unreacted aliphatic hydroxy compound at a temperature between about thirty and about forty degrees centigrade to produce a salt of pantothenic acid.

6. A process which comprises the steps of reacting a reagent selected from the group consisting of alkali metals, alkaline-earth metals, and alkali-metal hydrides, with an excess of an ether of ethylene glycol containing up to and including nine carbon atoms, reacting the thus-produced compound with β-alanine in the presence of the remaining unreacted ether of ethylene glycol at a temperature between about 20 and about 100 degrees centigrade to produce a salt of β-alanine, and reacting thereafter the salt of β-alanine with α-hydroxy-β,β-dimethyl-γ-butyrolactone in the presence of the remaining unreacted ether of ethylene glycol at a temperature between about twenty and about eighty degrees centigrade to produce a salt of pantothenic acid.

7. A process which comprises the steps of reacting a reagent selected from the group consisting of alkali metals, alkaline-earth metals, and alkali-metal hydrides, with an excess of an ether of diethylene glycol containing up to and including eleven carbon atoms, reacting the thus-produced compound with β-alanine in the presence of the remaining unreacted ether of diethylene glycol at a temperature between about 20 and about 100 degrees centigrade to produce a salt of β-alanine, and thereafter reacting the salt of β-alanine with α-hydroxy-β,β-dimethyl-γ-butyrolactone in the presence of the remaining unreacted ether of diethylene glycol at a temperature between about twenty and about eighty degrees centigrade to produce a salt of pantothenic acid.

8. A process which comprises the steps of reacting an alkaline-earth metal with an excess of an ether of ethylene glycol containing up to and including nine carbon atoms, reacting the thus-produced compound with β-alanine in the presence of the remaining unreacted ether of ethylene glycol at a temperature between about 20 and about 100 degrees centigrade to produce a salt of β-alanine, and reacting the salt of β-alanine with α-hydroxy-β,β-dimethyl-γ-butyrolactone in the presence of the remaining unreacted ether of ethylene glycol at a temperature between about 20 and about 80 degrees centigrade to produce a salt of pantothenic acid.

9. A process which comprises the steps of reacting an alkaline-earth metal with an excess of an ether of ethylene glycol containing up to and including nine carbon atoms, reacting the thus-produced compound with β-alanine in the presence of the remaining unreacted ether of ethylene glycol at a temperature between about thirty and about forty degrees centigrade to produce a salt of β-alanine, and reacting the salt of β-alanine with α-hydroxy-β,β-dimethyl-γ-butyrolactone in the presence of the remaining unreacted ether of ethylene glycol at a temperature between about thirty and about forty degrees centigrade to produce a salt of pantothenic acid.

10. A process which comprises the steps of reacting calcium with an excess of ethylene glycol monomethyl ether, reacting the thus-produced compound with β-alanine in the presence of the remaining unreacted ethylene glycol monomethyl ether at a temperature between about thirty and about forty degrees centigrade to produce calcium β-alanate, and reacting calcium β-alanate with α-hydroxy-β,β-dimethyl-γ-butyrolactone in the presence of the remaining unreacted ethylene glycol monomethyl ether at a temperature between about thirty and about forty degrees centigrade to produce calcium pantothenate.

References Cited in the file of this patent

UNITED STATES PATENTS

| | | |
|---|---|---|
| 2,367,791 | Parke et al. | Jan. 23, 1945 |
| 2,390,499 | Carlson et al. | Dec. 11, 1945 |
| 2,672,480 | Matlack | Mar. 16, 1954 |

OTHER REFERENCES

Liston et al.: J. A. C. S., vol. 60 (1938), page 1264.

Hurd: Chemistry of the Hydrides (1952), pp. 32–3, 43–4 and 48.